July 26, 1932.　　F. H. WAGNER　　1,868,618
GAS AND LIQUID CONTACT APPARATUS
Filed Sept. 14, 1928
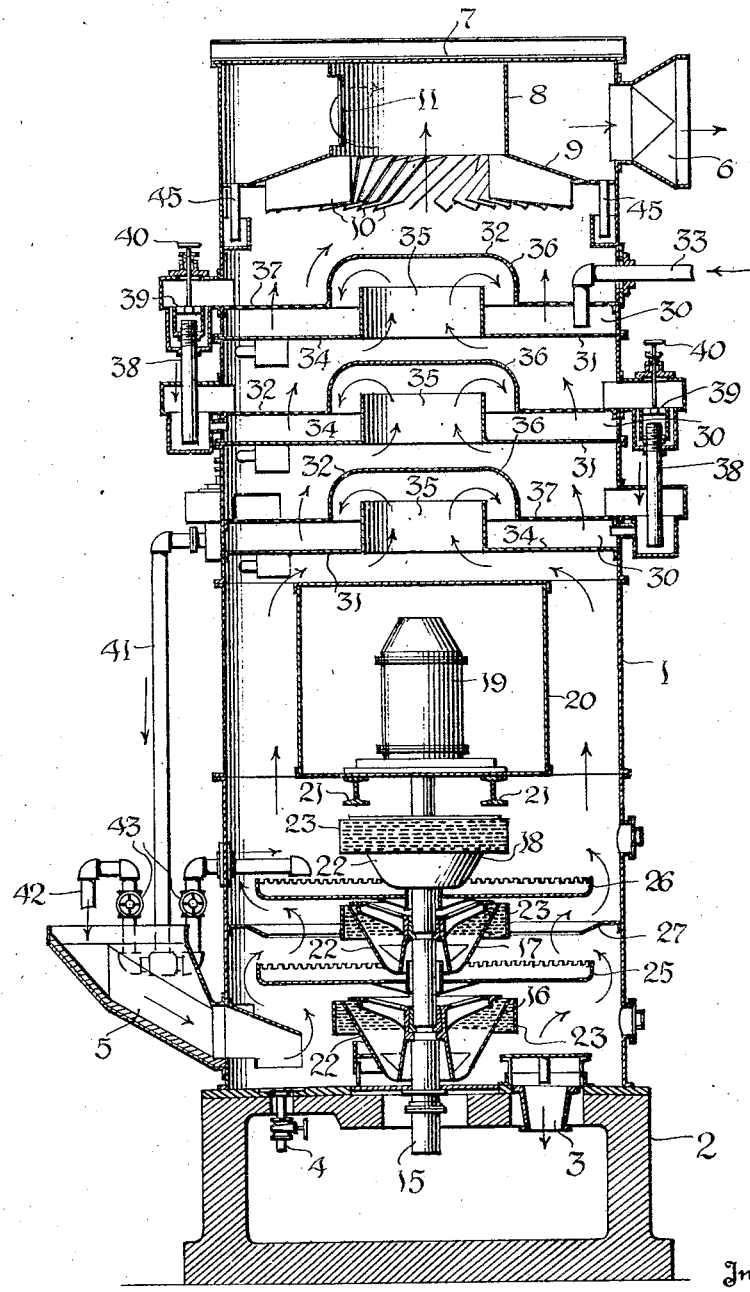
Inventor
Frederick H. Wagner
By Dodge and Ins.
Attorneys Patented July 26, 1932

1,868,618

UNITED STATES PATENT OFFICE

FREDERICK H. WAGNER, OF BALTIMORE, MARYLAND, ASSIGNOR TO THE BARTLETT HAYWARD COMPANY, OF BALTIMORE, MARYLAND, A CORPORATION OF MARYLAND

GAS AND LIQUID CONTACT APPARATUS

Application filed September 14, 1928. Serial No. 305,978.

This invention pertains to gas and liquid contact apparatus, and more particularly to a washer in which gases such as blast furnace gases may be washed to remove solids or foreign matter therefrom.

In general terms, the object of the invention is to provide improved apparatus of this character which is of simple and rugged construction and more efficient in operation than the apparatus heretofore employed for the purpose. While the apparatus embodying the invention may be utilized generally for the treatment of gases with liquids or for removal of by-products from gases, it is particularly adapted for the removal of solids from gases and such an application thereof will be described herein.

It has been found that a gas washer embodying a liquid pumping and spraying element, of the type shown in Letters Patent to Feld, No. 983,037, dated January 31, 1911, is well adapted for the removal of the coarser solid materials from a gas, such as blast furnace gas. In accordance with the invention, the gases are first washed with a spray produced by one or more elements of this character and the gases are then subjected to a different treatment adapted to remove completely the finer particles remaining in the gases. In the particular embodiment of the invention to be described, the latter treatment involves scrubbing the gases in one or more elements of the bubble or static type. In this manner, both the coarser and the finer materials are thoroughly and expeditiously removed from the gases.

Apparatus embodying the invention is illustrated in the accompanying drawing, which is a vertical sectional view of a washer.

Referring to the drawing, 1 denotes the shell of the casing, which may be cylindrical in form and built up of a plurality of superimposed sections in the usual manner. The washer casing is mounted upon a base or foundation 2 which may be hollow, as indicated, and serves as a drain or take-off for the liquids discharged through the overflow 3 and drain-pipe 4.

A gas inlet 5 opens into the lower end of the shell 1 and an outlet 6 is provided in the upper end of the shell. The inlet 5 may be connected to a blast furnace downcomer or to a gas producer, where it is desired to treat, clean or wash the gases therefrom.

The top of the shell is closed by a cover plate 7. Suitable baffles are disposed beneath the cover plate 7 adjacent the outlet 6; for example, a baffle comprising a cylindrical portion 8 and a frustro-conical portion 9 may be provided. A series of obliquely disposed baffle plates 10 are secured to the underside of the frustro-conical portion 9 of the baffle and an opening 11 in the baffle is located on the opposite side of the shell from the outlet 6 in order to cause the gases to follow a tortuous path and thereby effect a thorough removal of the moisture contained therein.

A spray scrubber element, preferably of the above-mentioned Feld type, is disposed in the lower portion of the casing 1 to effect the initial washing of the gases admitted through the inlet 5. In the embodiment of the invention illustrated, this element comprises a central rotatable shaft 15 carrying three cone-shaped pumping and spraying elements 16, 17, and 18, of the type shown in Feld Patent No. 983,037. It is to be understood however, that the construction and arrangement of this spray-type scrubber and the number of cones or sprayers employed may be variously modified to meet the exigencies of particular installations without departing from the scope of the invention.

The shaft 15 is driven at the proper rotative speed in any suitable manner; for example, an electric motor 19 may be disposed within the casing adjacent to the upper end of the shaft 15. The motor 19 is enclosed in a housing 20 to protect it from the gases and liquids within the casing of the washer, and the housing and motor are supported upon cross girders or brackets 21.

The construction of the pumping and spraying elements 16, 17 and 18 is well known, as above noted, and a detailed description of the same is unnecessary; each element comprises a cone-shaped cup member 22 secured to the shaft 15 and a cylindrical screen 23 surrounding and supported by the upper portion of the cup member, the upper portion of the cup member and the screen being perforated to facilitate the dispersion of the liquid raised by the centrifugal action of the cup member into a fine spray.

The cup members of the spraying elements 16, 17 and 18 are immersed at the bottom in the liquid accumulating in the lower portion of the casing and in the pans 25 and 26, respectively, and the rotation of said members draws up the liquid and disperses the same in form of a fine spray or mist in the path of the gases passing upwardly in the casing. The gases and spray are thoroughly commingled and the heavier particles of solid matter in the gases are entrapped by the liquid. An annular baffle plate 27 is disposed between the two pans 25 and 26 to control and direct the flow of gases and to cause the overflow from the pan 26 to flow into the pan 25.

In the upper part of the casing 1, one or more bubble washing elements 30 are disposed, three of these elements being illustrated in the drawing. Each of these elements comprises a pair of superimposed baffle plates 31 and 32 arranged to control the flow of the gases through a liquid supported thereon, the liquid being admitted through the pipe 33. The lower baffle plate 31 has an imperforate peripheral portion 34 and a central upstanding lip or tubular portion 35 defining a gas-passage. The upper baffle plate 32 has an inverted cup-shaped portion 36 overlying the tubular gas-passage through the lower baffle plate and a perforated or foraminous peripheral portion 37.

The level of the scrubbing liquid is maintained above the surface of the perforated baffle member 37 and the gases are thereby forced to traverse the screen in contact with the liquid, which is found to improve materially the efficacy of the washing operation. While washing liquid may be admitted to each scrubbing element, it is ordinarily sufficient to flow the liquid through the elements in series. Overflow connections 38 between each scrubbing element and the next lower element may be provided for this purpose, each connection embodying an adjustable weir or collar 39 secured to an adjusting handle 40 whereby the liquid level upon each screen 37 may be controlled.

The overflow from the lower bubble element 30 flows through a pipe 41 to the pan 26 of the upper "Feld" washer unit. If desired a portion of the overflow may be diverted through the pipe 42. Regulating valves 43 are provided in the pipes 41 and 42.

In operation, the gases admitted through the inlet opening 5 flow upwardly through the spray produced by the "Feld" washers, where the coarser particles are removed and retained by the liquid accumulating in the bottom of the casing, and thence through the tubular members 35 and screens 37 in contact with the liquid carried by the baffle plates 31 and 32, where the washing is completed by the removal of the finer particles contained in the gases. From the uppermost static washer unit, the gases pass over the surfaces of the baffle plates 10 and through the opening 11 to the outlet 6, said baffle plates serving as a moisture eliminator to remove drops of liquid entrained in the gases after washing. Any liquid deposited on the walls of the casing or the baffle 8 above the plate 9 flows into the trough formed by said plate and is returned to the chamber containing the static washer elements through pipes 45.

While I am aware that broadly considered the various elements employed in the apparatus hereinbefore set forth are old, the arrangement brings about a new result. The liquid pumping and spraying elements in the lower portion of the casing and the bubble washing elements located in the upper portion of the apparatus separately considered will not accomplish what the present apparatus brings about. This is by reason of the fact that the water spray through which the hot gases pass in the bottom sections saturates the gas with water vapor thus preparing it for condensation and cooling in the upper elements. By producing a high degree of saturation of the gas and the lower degree of final temperature, condensation of any nuclei present in the gas, or on the dust carried in the gas, is brought about. It is clear that no indirect condensing and cooling means can be adopted for this purpose since the wetted dust would adhere to any wall of a condenser of any type and clog the latter. This condition, of course, requires that the gas be cool and condensed in a body of water and the spray devices in the lower portion of the apparatus are found to be efficient for this purpose. The conditioned gas is wire drawn through the perforations in the upper elements 37, hence friction aided by repeated contraction and expansion rupture any possible gas film surrounding any nuclei and therefore permits the condensed vapor to settle on the dust particle, wet it, and carry it away.

It is to be understood that the detailed construction of the apparatus shown and described may be variously modified without departing from the scope of the invention, as set forth in the appended claims.

What is claimed is:—

1. In a gas washer, the combination of a casing, a central rotatable shaft in the casing, means for driving said shaft, a liquid pumping and spraying element secured to the shaft to be driven thereby, a bubble washing element in the casing in spaced relation to said pumping and spraying element, and means for supplying liquid to said washing and spraying elements.

2. In a gas washer, the combination of a casing, a central rotatable shaft in the casing, a motor for driving said shaft, said motor being disposed within said casing intermediate the ends thereof, a housing for the motor, a liquid pumping and spraying element in said casing driven by said shaft, a bubble washing element in said casing in spaced relation to said pumping and spraying element, means for admitting gases to the casing at a point adjacent the pumping and spraying element, and means for supplying liquid to said washing and spraying elements.

3. In a gas washer, the combination of a casing having a gas inlet at the bottom thereof and a gas outlet at the top, a central rotatable shaft in the lower portion of the casing, means for driving said shaft, a plurality of cone-shaped pumping and spraying elements secured to said shaft to be driven thereby, means for accumulating a body of liquid adjacent to the lower ends of said elements, bubble washing elements in said casing above said shaft and cone spraying elements, and means for supplying liquid to said washing and spraying elements.

4. In a gas washer, the combination of a casing having a gas inlet at the bottom thereof and a gas outlet at the top, a central rotatable shaft in the lower portion of the casing, means for driving said shaft, a plurality of cone-shaped pumping and spraying elements in said shaft to be driven thereby, bubble washing elements in said casing above said shaft and cone spraying elements, means for supplying liquid to said bubble washing elements, and means for conducting the overflow therefrom to said cone spraying elements.

In testimony whereof I have signed my name to this specification.

FREDERICK H. WAGNER.